United States Patent
Branda et al.

(10) Patent No.: US 8,166,077 B2
(45) Date of Patent: Apr. 24, 2012

(54) MAPPING A CLASS, METHOD, PACKAGE, AND/OR PATTERN TO A COMPONENT

(75) Inventors: Steven Joseph Branda, Rochester, MN (US); John Joseph Stecher, Rochester, MN (US); Robert E. Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 12/241,675

(22) Filed: Sep. 30, 2008

(65) Prior Publication Data

US 2010/0083228 A1   Apr. 1, 2010

(51) Int. Cl.
*G06F 9/44* (2006.01)
*G06F 17/30* (2006.01)

(52) U.S. Cl. .................. 707/803; 707/960; 717/130

(58) Field of Classification Search .................. 717/130, 717/131; 707/803, 960
See application file for complete search history.

(56) References Cited

U.S. PATENT DOCUMENTS

| | | | | |
|---|---|---|---|---|
| 5,838,975 A * | 11/1998 | Abramson et al. | ............. | 717/129 |
| 5,937,190 A * | 8/1999 | Gregory et al. | ............. | 717/131 |
| 6,226,788 B1 * | 5/2001 | Schoening et al. | ............. | 717/107 |
| 6,662,359 B1 * | 12/2003 | Berry et al. | ............. | 717/130 |
| 6,721,941 B1 * | 4/2004 | Morshed et al. | ............. | 717/127 |
| 6,742,178 B1 * | 5/2004 | Berry et al. | ............. | 717/130 |
| 7,096,458 B2 * | 8/2006 | Bates et al. | ............. | 717/124 |
| 7,328,430 B2 * | 2/2008 | Fairweather | ............. | 717/136 |
| 7,506,315 B1 * | 3/2009 | Kabadiyski et al. | ............. | 717/128 |
| 7,512,634 B2 * | 3/2009 | McMillen | ............. | 1/1 |
| 7,606,893 B2 * | 10/2009 | Petrov et al. | ............. | 709/224 |
| 7,668,796 B2 * | 2/2010 | Hinchey et al. | ............. | 706/48 |
| 7,877,734 B2 * | 1/2011 | Branda et al. | ............. | 717/130 |
| 7,917,894 B2 * | 3/2011 | Chen et al. | ............. | 717/124 |
| 2003/0149960 A1 * | 8/2003 | Inamdar | ............. | 717/118 |
| 2004/0006760 A1 * | 1/2004 | Gove et al. | ............. | 717/100 |
| 2004/0158819 A1 * | 8/2004 | Cuomo et al. | ............. | 717/128 |
| 2006/0101418 A1 * | 5/2006 | Barsness et al. | ............. | 717/130 |
| 2007/0150871 A1 * | 6/2007 | Barsness et al. | ............. | 717/128 |
| 2007/0162897 A1 * | 7/2007 | Gerard et al. | ............. | 717/130 |
| 2007/0169003 A1 * | 7/2007 | Branda et al. | ............. | 717/130 |
| 2008/0134156 A1 * | 6/2008 | Osminer et al. | ............. | 717/140 |
| 2008/0201705 A1 * | 8/2008 | Wookey | ............. | 717/175 |

* cited by examiner

Primary Examiner — James Trujillo
Assistant Examiner — Jorge A Casanova
(74) Attorney, Agent, or Firm — Wood, Herron & Evans LLP (57) ABSTRACT

A program product, apparatuses, and methods provide for the collection of profile information for a component of a software program by generating a data structure that maps at least one method to a component. The method includes a name, and the data structure maps the method to the component using at least a portion of the name of the method. A class or pattern may also be mapped to a component. Furthermore, during profiling, a statistic associated with the execution of the method is determined; the data structure is accessed using the name of the method to determine the associated component; and the determined statistic is associated with the determined component. By doing so, method level and class level information can be aggregated to improve profiling, often leading to a clearer picture of which components are contributing to the performance and memory footprint of large scale software programs.

23 Claims, 8 Drawing Sheets

```
<component="comp1" comment="Classes Alone">
    <pattern>com.ibm.package1.class1</pattern>
    <pattern>com.ibm.package1.class2</pattern>
    <pattern>com.ibm.package1.class3</pattern>
</component>

<component="comp2" comment="Methods Alone">
    <pattern>com.ibm.package2.classA.method1</pattern>
    <pattern>com.ibm.package2.classA.method2</pattern>
    <pattern>com.ibm.package2.classB.method1</pattern>
</component>

<component="comp3" comment="Packages Alone">
    <pattern>com.ibm.package3</pattern>
    <pattern>com.ibm.package4</pattern>
    <pattern>com.ibm.package5</pattern>
</component>

<component="comp4" comment="Combination">
    <pattern>com.ibm.package3.classAB.method3</pattern>
    <pattern>com.ibm.package4</pattern>
    <pattern>com.ibm.package5.classbc</pattern>
</component>
```

FIG. 8

MAPPING A CLASS, METHOD, PACKAGE, AND/OR PATTERN TO A COMPONENT

FIELD OF THE INVENTION

The invention relates to computers and computer software, and in particular, to collecting profile information for computer programs.

BACKGROUND OF THE INVENTION

As computers and the computer software executing on computers becomes more complex and powerful, performance analysis techniques have increased in importance for optimizing the performance and reliability of computer software. Profiling is one technique that has been found to be useful in connection with analyzing the performance of computer software.

Modern software applications are often object-oriented in nature, and are typically organized into a hierarchy of program entities that perform the various operations of the applications. Many software applications, for example, may contain at least one component, and each component may contain one or more classes. Furthermore, each class may contain one or more methods. With profiling, a tool commonly referred to as a profiler is used to capture events and other statistical information about program code being profiled in the software application. For example, a profiler may be used to capture information regarding memory and other resource usage for the purpose of identifying potential memory leaks, garbage collection problems, or other circumstances that may lead to excessive consumption of system resources. Additionally, the profiler may be used to capture information such as the time spent in various routines or methods, the number of instances created for certain classes, and the state of a call stack for the purpose of identifying particular sections of program code that perform sub-optimally. Profiling may be performed by adding special fragments of code to the application program code prior to compilation. The fragments of code added prior to compilation (often referred to as instrumenting or instrumentation) may enable monitoring or measuring of the performance of the application.

Alternatively, a runtime environment may support data collection capabilities to capture relevant profiling information for program code that does not have special fragments of code added prior to compilation.

Conventional profilers typically collect profile information at the method level, and often times this method level information is adequate for analyzing the performance of small software applications as these typically contain relatively few components and classes. For example, a person analyzing the performance of such small software applications may be able to manually extrapolate problems with the components and classes from the method level information by manually connecting the methods to the associated classes and components. But, using method level information captured by such profilers may present problems when conducting performance analysis on large software applications.

Much more complicated than small software applications, large software applications typically contain many components, classes, and methods. For example, a single instance of a large application server may load about 12,000 classes when started. Each class may contain several methods, and as such, the application server instance may load about 50,000 to about 100,000 methods when started. Other examples of large software applications that may contain many components, classes, and methods include native code database applications, messaging engines, and other enterprise applications.

Indeed, performance analysis of large software applications may be challenging with modern day profiling tools because of the larger number of components, classes, and methods, and also because the performance issues may not be localized to just a few methods. For instance, there may be larger scale performance issues associated with a few, or many, of the classes or components of the system, or with the interaction of the classes and components within the system. As a result, the method level information captured by conventional profilers may be inadequate for effectively analyzing the performance of such large software applications.

Specifically, the method level information provided by conventional profilers may be too granular to be useful when analyzing larger scale performance issues. Example, when analyzing the startup time and memory footprint of an application server, performance issues may not be localized to a single class or method or even to a few methods or classes. Indeed, when analyzing the memory footprint of an application server, the individual memory footprint of each class or method may not be meaningful. Rather, the performance issues of each method may contribute to the performance issues of their respective classes. Likewise, the performance issues of each class may contribute to the performance issues of their respective components. And, in the context of large programs such as application servers, manually mapping each of the potentially tens of thousands of methods to its associated component may quickly become intractable.

Therefore, a need exists in the art for an improved manner of profiling, and in particular, an improved manner of profiling large software applications.

SUMMARY OF THE INVENTION

The invention addresses these and other problems associated with the prior art by providing for the collection of profile information for a component of a software program by generating a data structure that maps at least one method and/or class to the component using at least a portion of the name of the method or class. Furthermore, in response to execution of a method by a profiler during profiling of the software program, a statistic associated with the execution of the method may be determined by accessing the data structure using the name of the method and/or the class of that method to determine the component associated with the method or class; and associating the determined statistic with the determined component. By doing so, method and/or class level information can be aggregated to improve software profiling, often leading to a clearer picture of which components are contributing to the performance and memory footprint of large scale software programs.

The invention address these and other problems associated with the prior art by also providing for the collection of profile information for a component of a software program by generating a data structure that maps at least one pattern to the component. The pattern includes at least one name and the pattern is associated with a method. The data structure maps the pattern to the component using at least a portion of the name of the pattern; and in response to execution of the method by a profiler during profiling of the software program, a statistic associated with the execution of the method may be determined, the data structure may be accessed using a name of the method, and the determined statistic may be associated with the determined component. The pattern may be representative of a package, a class and/or a method.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention may collect profile information for a component of a software program by generating a data structure that maps a class or method to a component based on the name of the class or method. As such, method level information and class level information, including statistics generated during profiling, may be aggregated and linked to each component in the database structure. Moreover, the name of the class or method may be used to access the data structure to efficiently determine the component associated with the class or method executed by the profiler, and the aggregate cost of a component may be determined by accessing that component in the database structure. Alternatively, a pattern may be utilized to perform the mapping. The pattern may represent, a package, a class, or a method. Although this disclosure will focus on packages, classes, and/or methods, the present invention is not limited as such, and other items that may be mapped are contemplated within the scope of the present invention.

Furthermore, although the embodiments discussed hereinafter focus on one application of the invention in a JAVA programming environment, those of ordinary skill in art will appreciate that the invention may be utilized in connection with other programming environments as well, such as C. The environment used, however, may affect whether methods and classes, or classes alone, or methods alone, may be mapped. For example, there are typically no classes in the C programming language, therefore, only methods may be mapped using the C language in some embodiments. In Java, classes are typically available, thus, both classes and methods may be mapped, or only classes may be mapped, or only methods may be mapped in some embodiments. Likewise, C may have no packages, but Java does, and the same may be applied. However, those of ordinary skill in the art will appreciate that the scope of the present invention also includes analogous items to packages, classes, and/or methods, for example available in C and/or in other languages. Moreover, the use of any of this terminology is not meant to limit the scope of the present invention, especially as a variety of items may be mapped utilizing the flexibility of patterns. Indeed, if a pattern may be created for an item, those of ordinary skill in the art may appreciate that the item may be within the scope of the present invention.

Additionally, those of ordinary skill in the art will appreciate that although the terminology "or" is utilized, for example, in "package, class or method", those of ordinary skill in the art will appreciate that the terminology may refer to all of package, class and method, or alternatively, to only the package, only the class and/or only the method (see FIG. 8), etc.

Furthermore, the terms "method" or "methods" are used generically herein to refer to methods, procedures, routines, functions, and the like. Additionally, depending on the implementation details of the software program being profiled, a method may be associated with a given class, multiple classes, or no class at all. Similarly, the terms "class" or "classes" are used generically herein to refer to classes, objects, and the like. One of ordinary skill in the art will appreciate that the terminology is not intended to limit the present invention.

Figure 1:
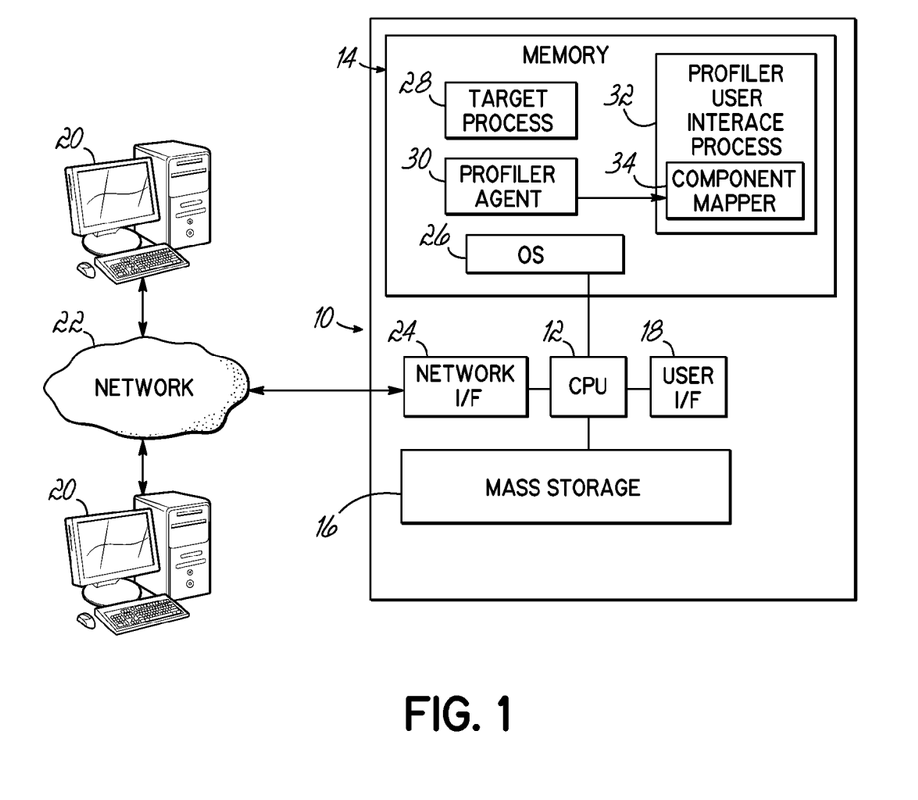
FIG. 1 is a block diagram of a profiling system consistent with the principles of the present invention.

Turning now to the Drawings, wherein like numbers denote like parts throughout the several views, FIG. 1 illustrates an exemplary profiling system with an apparatus 10 suitable for collecting profile information for a component of a software program consistent with the principles of the present invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. The networks 22 may also include any socket, etc. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

At least one target process 28 may be resident in memory 14. The target process 28 may represent a process for which profile information may be collected consistent with the principles of the invention. Profiling in the illustrated embodiment may be accomplished using a profiler agent 30 also resident in memory 14. The profiler agent 30 is configured to forward profiling events to a profiler user interface process 32. The profiler user interface process 32 may allow the user to configure the profiler and receive profiler information generated during the execution of the target process 28. A component mapper 34 may be part of the profiler user interface process 32. The component mapper 34 provides a means to associate profiling events and profiling information associated with a particular method, process, function, routine, class, or other object executing within target process 28 with the component to which it belongs.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
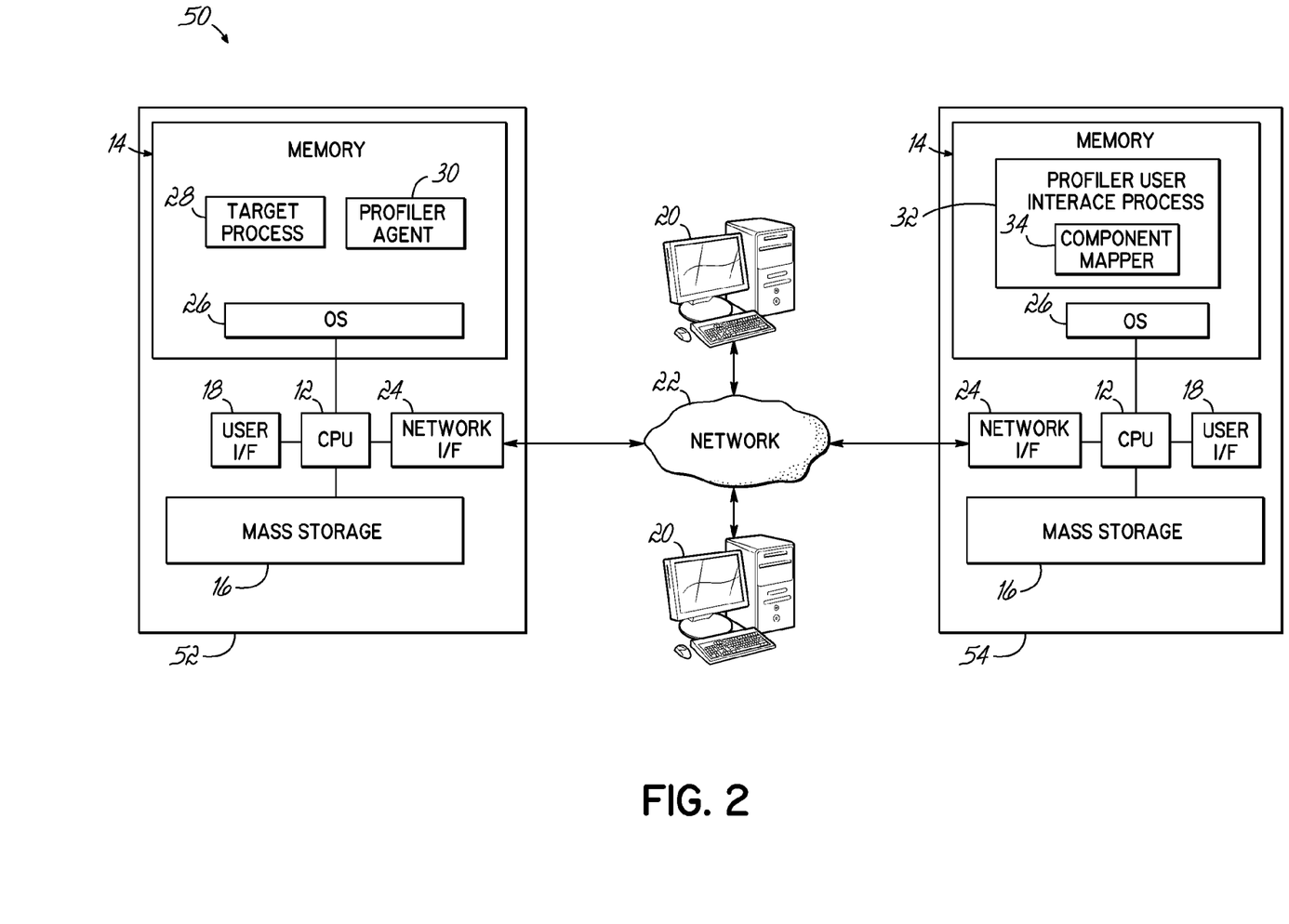
FIG. 2 is a block diagram of another profiling system consistent with the principles of the present invention.

Turning now to another profiling system consistent with the principles of the present invention, FIG. 2 illustrates another exemplary hardware and software environment for an apparatus 50 suitable for collecting profile information for a component of a software program. Apparatus 50 may include two independent computers 52, 54, which may communicate via network 22. Similar to the first embodiment discussed hereinabove, the target process 28 may be resident in the memory 14 of computer 52, with the profiler agent 30 resident in memory 14 of computer 52 and configured to forward profiling events associated with the execution of target process 28 to the profiler user interface process 32. However, the profiler user interface process 32 may be resident in memory 14 of computer 54, instead of resident in memory 14 of computer 52, as is the case in FIG. 1. The profiler agent 30 resident in memory 14 of computer 52 may forward the profiling events associated with the execution of the target process 28 via network 22 to the profiler user interface process 32, which is resident in memory 14 of computer 54. As such, the computer 52 may function like a server computer while the computer 54 may function like a client computer.

Despite the exemplary embodiments illustrated in FIG. 1 and FIG. 2, these are not intended to limit the present invention. Indeed, those skilled in the art will recognize that other alternative hardware and/or software environments may be used without departing from the scope of the invention. For example, different functionality than that described herein may be accorded to the above mentioned items consistent with the principles of the present invention.

Nonetheless, in the context of the invention, collecting profile information for a component of a software program consistent with the principles of the invention typically may comprise several stages. First, component mapping data may be input into the system to allow profiling events associated with particular packages, methods or classes. Second, a data structure may be built to facilitate the mapping of particular packages, methods or classes to the associated components. A decision tree may be utilized as the data structure to map packages, classes or methods to components. All of these may accomplished by utilizing patterns such as patterns including a package, class and/or method, however, those of ordinary skill in the art will appreciate that other items that may be mapped or otherwise benefit from the principles of the present invention are contemplated in the scope of the present invention, for example, debug symbols, source code name, delimiter, name of method in C. The decision tree may be a modified decision tree (e.g., a conventional decision tree being modified to contain the information). Nonetheless, the decision tree may include a plurality of nodes, with each node associated with a character, a terminator flag, and/or a component.

Third, the data structure may be pruned to the minimum possible representation so as to make the tree less specific (e.g., by removing extraneous and/or redundant information). Fourth, profiling events, for example, indicative of the length of time for a particular method to execute, may be attributed to the associated components by utilizing the component mapping data structure. Indeed, a statistic associated with the execution of the package, class or method may be associated with the component that is mapped to the package, class or method, for example, from the fully qualified method name. The fully qualified method name may 1) include the complete package name, the complete class name, and the complete method name, 2) be with or without variables, and/or 3) be with or without parenthesis, if these are supported. Additionally, analogous concepts are contemplated herein, for example, debug symbols, source code name, delimiter, name of method in C such that the source file name may be analogous to the package and/or class concepts of Java. Indeed as the fully qualified method name may include the complete package name, the complete class name, and the complete method name, for example, these names may be utilized to attribute the statistic as necessary (e.g., attributing the statistic to the component associated with a method because of the method name in the fully qualified method name and/or attributing the statistic to the component of a class because of the class name in the fully qualified method name). Additionally, a statistic associated with a method may be mapped to a component based on the class to which the method belongs. One of ordinary skill in the art will appreciate, however, that these steps do not have to be executed in the order enumerated above. Moreover, some of the steps may even be omitted (e.g., pruning) without departing from the spirit of the invention.

As such, method level information and class level information, including statistics generated during profiling, may be aggregated and linked to each component in the database structure. Moreover, the fully qualified method name may be used to access the data structure to determine the component associated with the package class or method executed by the profiler to apply the statistic to the component, and the aggregate cost of a component may be determined by accessing that component in the database structure (e.g., by drilling down). Indeed, it is worth noting that nearly all of the events that a profiler may pick up during profiling may happen in a method and it may be the fully qualified method name and statistic(s) that is passed to the data structure when asking for the associated component in order to add the statistic to the associated component. However, even though the fully qualified method name is fed to the data structure, the statistic may still be associated with the component corresponding to the correct package or class or method.

Figure 3:
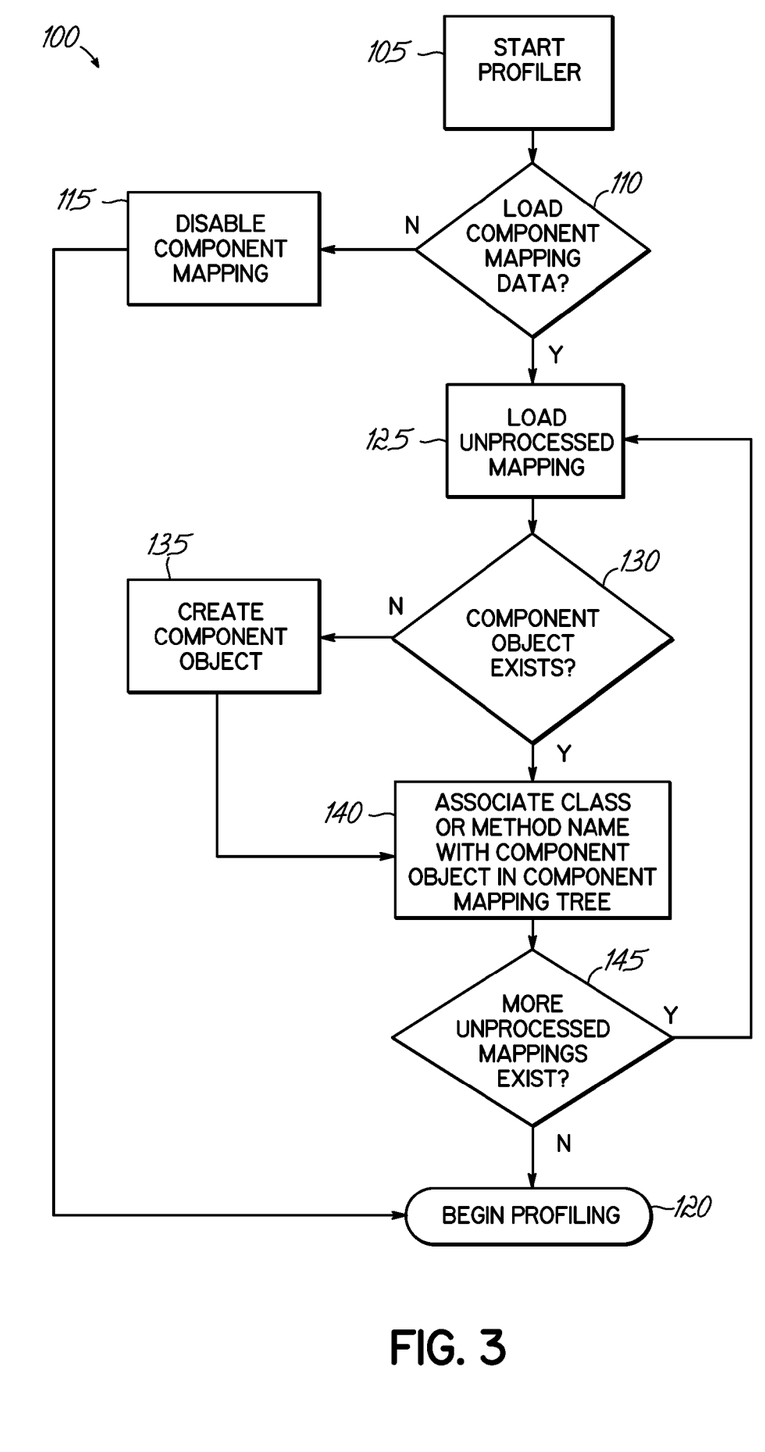
FIG. 3 is a flowchart illustrating an exemplary component mapping routine that may be executed by the profiling systems of FIG. 1 and FIG. 2 consistent with the principles of the present invention.
Figure 8:
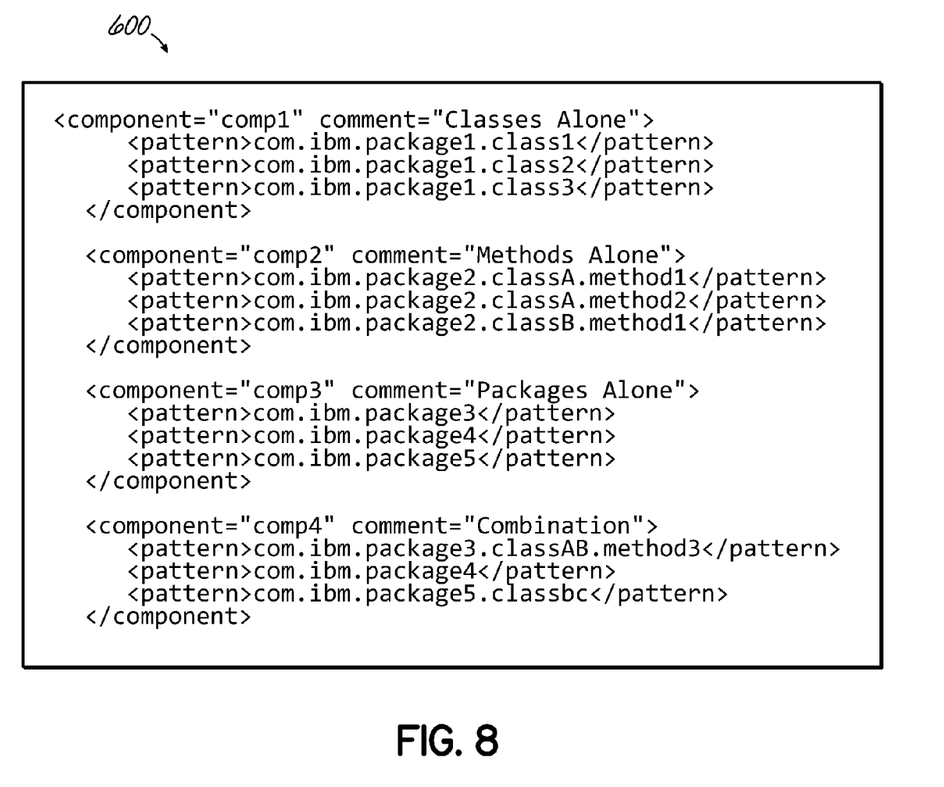
FIG. 8 is an illustration of an exemplary component mapping data.

Turning to FIG. 3, this figure illustrates an exemplary component mapping routine 100 that may allow component mapping information to be input into the profiling systems described hereinabove. For example, the user may manually enter information that maps the patterns to their associated components, or alternatively, an input file that contains the mapping of patterns to their associated components may be input into the system. An example of component mapping data 500 is illustrated in FIG. 8. Each pattern may be complete (e.g., containing a fully qualified class name, a fully qualified method name, etc.) or partial. Furthermore, each pattern may be in one of the following categories, which will be discussed in terms of an example: category 1 is a partial package name (e.g., com/ib); category 2 is a complete package name (e.g., com/ibm/); category 3 is a complete package name and a partial class name (e.g., com/ibm/testcla); category 4 is a complete package name and a complete class name (e.g., com/ibm/testclass2.); category 5 is a complete package name, a complete class name, and a partial method name (e.g., com/ibm/testclass2.runT); and/or category 6 is a complete package name, a complete class name, and a complete method name (e.g., com/ibm/testclass2.runTransaction( )). Users have the ability to define their mapping as packages alone, classes alone, methods alone, or any combination of the three, as illustrated in the component mapping data 500.

It is worth noting that the component mapping data 500 illustrated in FIG. 8. that the patterns for "classes alone" include the package names in the pattern because in Java, and other programming languages that supports packages, the package name will be part of the fully qualified class name. In Java, classes that are "not part of a package" are typically implicitly part of the "default" package such that the absence of a package name in front of the class name actually designates that this class is part of the Default package. Thus, as long as classes belong to packages, the actual name of the Class may contain the name of the package in the pattern, and likewise, as long as methods belong to classes, the name of the method map contain the class and package names in the pattern. Thus, the section in the component mapping data 500 that says "classes alone" include those that are only class names, and only events that map to those classes will get assigned to that component. If an event comes in from com.ibm.package1.class4, this is a different class, and the event will not get mapped to that component, even though all the other classes listed are also in com.ibm.package1.

Profiling begins in block 105 when the profiler application is started. Once profiling has started, the user may be prompted in block 110 as to whether or not component mapping data should be loaded. The decision of block 110 may be manually entered by the user, or may alternatively be an automatic system setting. If component mapping data is not loaded, component mapping is disabled in block 115 and profiling begins in block 120 with the component mapping disabled.

If component mapping data is to be loaded, the first unprocessed mapping of a class or method from the component mapping data is loaded in block 125. An unprocessed mapping may refer to the next component entry that has yet to be processed. It is worth noting that component mapping data may also refer to the entire component mapping (e.g., contained in a file). For a large piece of software, the component mapping data may contain hundreds of components that encapsulate tens of thousands of classes in un-reduced form. Next, block 130 determines whether a component object already exists for the first unprocessed mapping. If a component object for the first unprocessed mapping does not already exist, then a new component object is created in block 135 and control passes to block 140 to associate the pattern (e.g., package, class or method name) of the first unprocessed mapping with the newly created component object in a component mapping tree. Specifically, block 140 may pass control to routine 200 in FIG. 4 to begin to generate the component mapping tree by entering the pattern (e.g., package, class or method names) from the component mapping data into the component mapping tree. After routine 200 completes, control may return to block 140. Thus, those of ordinary skill in the art will appreciate that in addition to using the component mapping data to create component objects and associating the pattern (e.g., package, class or method name) with the component objects, the component mapping data may be utilized to generate the component mapping tree.

The decision tree implementation of the database structure will be referred to herein as the component mapping tree, but it is for illustrative purposes only, and is not intended to limit the invention in any way. Indeed, other data structures that are not decision trees may be utilized in some embodiments. Generation of the component mapping tree will be discussed in more detail in connection with FIGS. 4-6.

Figure 4:
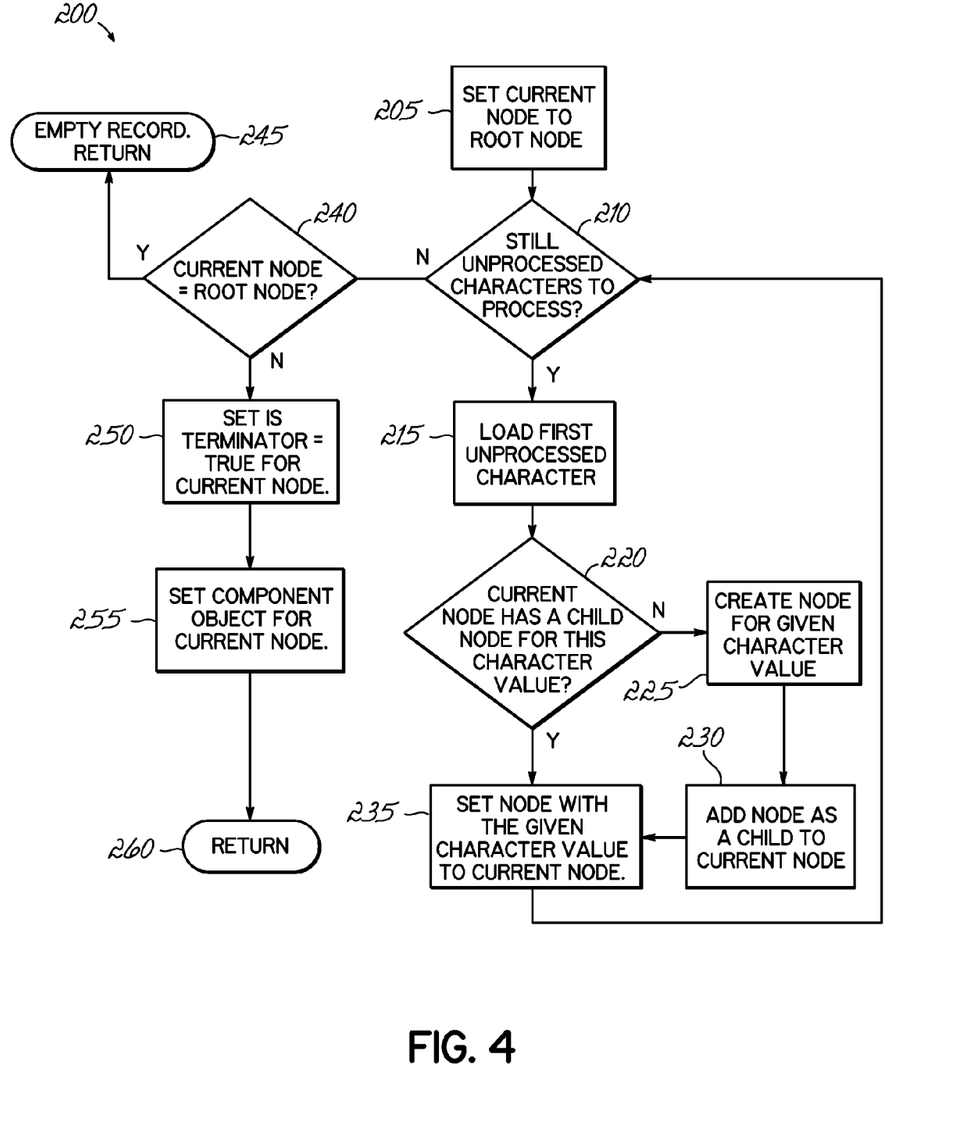
FIG. 4 is a flowchart illustrating an exemplary component mapping tree generation routine that may be executed by the profiling systems of FIG. 1 and FIG. 2 consistent with the principles of the present invention.

Returning to FIG. 3, if a component object already exists for the first unprocessed mapping ("yes" branch of block 130), then the pattern (e.g., package, class or method name) of the first unprocessed mapping is associated with that preexisting component object in the component mapping tree in block 140 and then to routine 200 in FIG. 4. Regardless of the path, after block 140, a determination is made as to whether or not there are more unprocessed mappings in block 145. If there are more unprocessed mappings ("yes" branch of block 145), then control may pass to block 125 to load the next unprocessed mapping and eventually on to block 140 to process the pattern (e.g., package, class or method name) as described above. If there are no more unprocessed mappings ("no" branch of block 145), then profiling may begin at block 120.

Turning now FIG. 4, which illustrates an exemplary component mapping tree generation routine 200. An exemplary tree that may be generated with routine 200 is component mapping tree 500 in FIG. 7. Once the component mapping tree is generated, the component mapping tree may be reused and/or may be dynamically updated in some embodiments.

As an overview, a component mapping tree may include a plurality of nodes. The pattern (e.g., name of the package, class or method) includes a series of characters, and each pattern (e.g., name of the package, class or method) may be associated with nodes in the plurality of nodes. Specifically, each character from the pattern (e.g., package, class or method name) of the component mapping data may be associated with a node in the plurality of nodes of the component mapping tree. For example, a first node in the plurality of nodes may include the first character of the pattern (e.g., name of the package, class or method), subsequent nodes in the plurality of nodes may include the subsequent characters of the pattern (e.g., name of the package, class or method), and a terminating node in the plurality of nodes may include the last character of the pattern (e.g., name of the package, class or method).

The terminating node may also include the component associated with the package, class or method. A terminator flag may be associated with the terminating node. The terminator flag may be utilized to identify the node that indicates the component associated with the package, class or method when the component mapping tree is traversed. Moreover, each node associated with a character of the pattern (e.g., name of the package, class or method), other than the first character, may be related to a parent node associated with an immediately preceding character from the pattern (e.g., name of the package, class or method).

Starting with block 205 in routine 200, the current node is set to the root node of the component mapping tree, and then, block 210 may determine if there are still unprocessed characters in the pattern (e.g., name of the package, class or method to process). If there are unprocessed characters to process ("yes" branch of block 210), then the first unprocessed character is loaded in block 215.

Next, block 220 determines whether the current node has a child node for the character value loaded in block 215. If the current node does not have a child node for the loaded character value ("no" branch of block 220), a node is created in block 225 and the loaded character value from block 215 is associated with the created node. The node created in block 225 is added as a child node to the current node in bock 230, and set as the current node in block 235. Returning to block 220, if the current node already had a child node for the loaded character value ("yes" branch of block 220), then the child node of the current node is set to the current node in block 235. As such, the nodes in the component mapping tree that were previously created for the pattern (e.g., name of the package, class or method) (e.g., during a previous execution of routine 200) may be reused instead of recreating duplicate nodes for the same name. As such, no nodes or only some nodes for characters that do not have a previously created node in the component mapping tree may need to be created in some embodiments.

From block 235, control may pass to block 210 to continue processing each character in the pattern (e.g., name of the package, class or method). Once there are no unprocessed characters in the pattern (e.g., name of the package, class or method) to process ("no" branch of block 210), block 240 determines whether the current node is the root node. If the current node is the root node ("yes" branch of block 240), then the pattern (e.g., name of the package, class or method) is empty and should be ignored in block 245. As such, control may return to block 140 in FIG. 3.

But, if the current node is not the root node ("no" branch of block 240), then the pattern (e.g., name of the package, class or method) is not empty, and because there are no more unprocessed characters, the current node may contain the last character of the pattern (e.g., name of the package, class or method). Thus, the terminator flag may be set to true for the current node in block 250. The component mapped to the package, class or method may also be associated with the current node in block 255. Control may then return to block 140 in FIG. 3 (block 260). Although those of ordinary skill in the art may appreciate the benefits of associating the component with the last node, for example, with respect to traversal of the component mapping tree and searching for the component, one of ordinary skill in the art will appreciate that the terminator flag and/or the component associated with the package, class or method is not required to be associated with the last node of the pattern (e.g., name of the package, class or method) in some embodiments.

Figure 5:
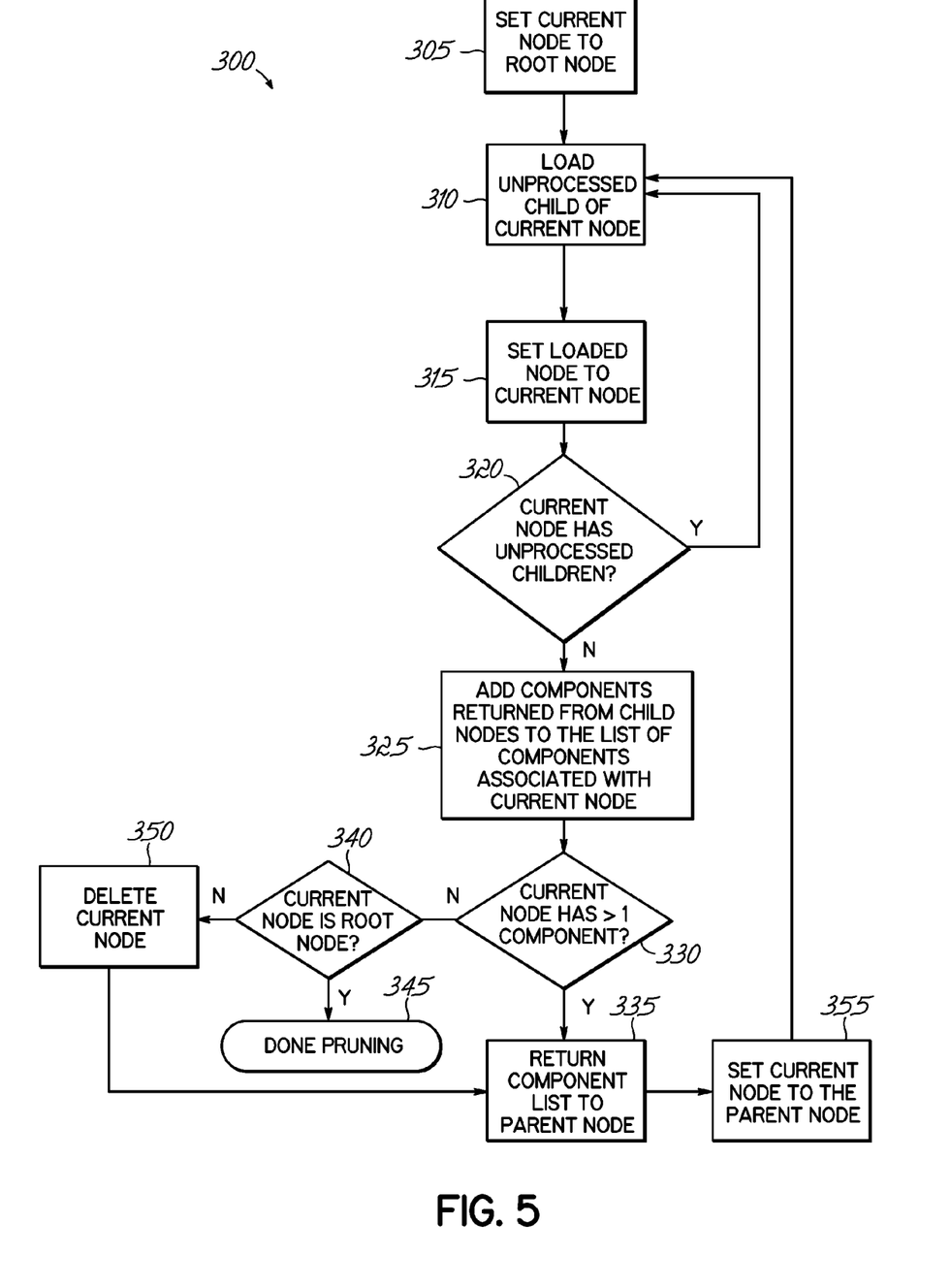
FIG. 5 is a flowchart illustrating an exemplary pruning routine that may be executed by the profiling systems of FIG. 1 and FIG. 2 consistent with the principles of the present invention.

Turning to FIG. 5, once the component mapping tree has been generated by adding each package, class or method to component mapping to the tree according to routine 200 in FIG. 4, those of ordinary skill in the art will appreciate that it may be desirable to remove extraneous information and/or redundant information from the component mapping tree by pruning the component mapping tree to further improve performance. The tree may be pruned by deleting at least one node. If the component mapping tree is desirably 100% inclusive, however, meaning that every package, class or method that is called in the program to be profiled has an entry in the component mapping tree, then pruning the tree may not change the output. Alternatively, if there is not a lot of data, it may not be worth pruning.

FIG. 5 illustrates an exemplary pruning routine 300 for pruning the component mapping tree. Starting with block 305, the current node is set to the root node. Next, in block 310, the first unprocessed child node of the current node is loaded. The loaded child node from block 310 may then be set to the current node in block 315. Next, block 320 determines whether the current node has any unprocessed child nodes. If the current node does have at least one unprocessed child node ("yes" branch of block 320), control may pass to block 310 to load the next unprocessed child of the current node. As such, blocks 310, 315, and 320 may be repeated to identify the last child node. Furthermore, the associated component may be loaded when the child nodes are loaded.

Once the current node does not have any unprocessed children ("no" branch of block 320), processing of the current node may proceed to block 325. In block 325, any components returned from the processing of the child nodes are added to the list of components associated with the current node. Next, block 330 evaluates whether the number of components in the list of components associated with the current node is greater than one. If the number of components in the list of components is greater than one ("yes" branch of 330), the list of components may be returned to the parent node of the current node in block 335.

Returning to block 330, if the number of components in the list of components associated with the current node is not greater than one ("no" branch of 330), control may pass to block 340 to evaluate whether the current node is the root node. If the current node is the root node ("yes" branch of block 340), then pruning of the component mapping tree may complete in block 345. However, if the current node is not the root node ("no" branch of block 340), the current node is deleted in block 350, and the list of components associated with the deleted node may be returned to the parent node in block 335.

Regardless of the path taken, control may pass from block 335 to block 355, where the current node is set to the parent node. From block 355, control may pass to block 310 to load the next unprocessed child node of the current node. The pruning process may continue until every node of the component mapping tree has been processed.

Those of ordinary skill in the art may appreciate that pruning the component mapping tree using routine 300 of FIG. 5 may allow the component mapping tree to be represented in the least specific manner, and as such, the component mapping tree may be utilized in a way that allows classes or methods to be mapped to components even though the classes or methods may not be explicitly included in the component mapping data in FIG. 3 that was utilized to generate the tree. Alternatively, even if all of the packages, classes or methods executed by the profiler are present in the component mapping data entered in FIG. 3, pruning the component mapping tree may still improve performance. For example, in the context of a WebSphere Application Server, available from International Business Machines Corporation, a pruned component mapping tree may be smaller in size (e.g., about one eighth the size) in comparison to a component mapping tree that is not pruned. As a result, the amount of memory required to store the representation of a pruned component mapping tree may be less (e.g., about one sixth as much) as would be required to store the same unpruned component mapping tree.

Figure 6:
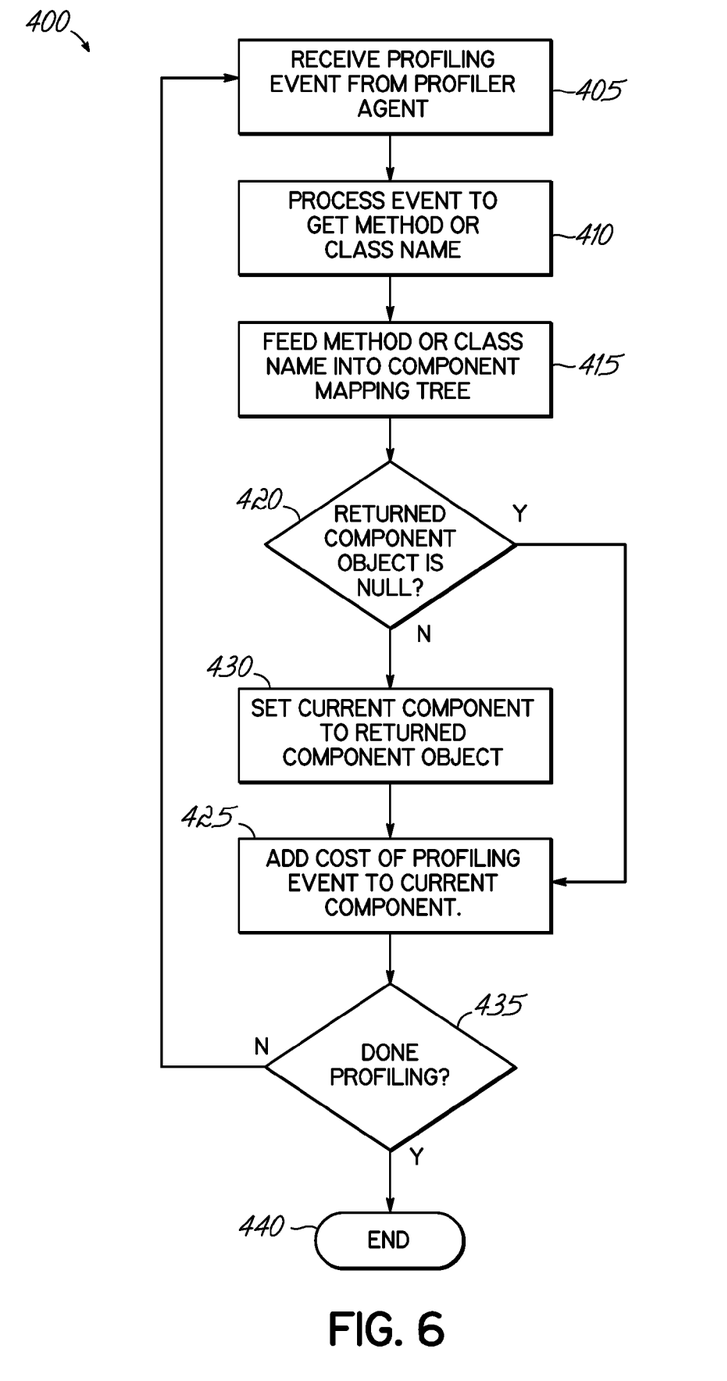
FIG. 6 is a flowchart illustrating an exemplary profiling routine that may be executed by the profiling systems of FIG. 1 and FIG. 2 consistent with the principles of the present invention.

Once the component mapping tree has been built and optionally pruned, profiling may begin. When a profiler runs, it generates events that are associated with the component of the packages, methods or classes. A profiling event may, for example, correspond with how long it took for a particular method to execute and return. It is worth noting that prior to profiling, the terminating node with the associated component may be a container with a plurality of fields. The fields may each have a value of zero until statistics from the profiling events are generated. As an example, the container may include a field for the name of the component, a field for the number of cycles, a field for the number of CPU, a field for MB of memory, a field for number of cycles or bytes of JDK code, a field for number of long Java count, string name log total count, a field for total count, a field for compiling count (e.g., classes), a field for number of cycles waiting (e.g., in the context of multiple processors and/or multi-threading), etc. Indeed, those of ordinary skill in the art may appreciate that there may be fields for the typical events generated by profilers. The container may include five fields, for example. Nonetheless, the component mapping tree may be used to map a profiling event associated with a given package, class or method to the component that the package, class or method is associated with. As such, the amount of time it took for the particular method to execute may be mapped to the component associated with the method. FIG. 6 illustrates an exemplary profiling routine 400 for mapping profiling events to components using the component mapping tree.

Indeed, those of ordinary skill in the art will appreciate that exemplary routine 400 illustrates how the component mapping tree may be accessed using the fully qualified name of the method in order to look up the component associated with the method. Although the fully qualified method name may be fed to the data structure, nonetheless, the statistic may be associated with the correct package, class or method. Furthermore, routine 400 illustrates how the "cost" of executing the class or method may then be directly attributed to the associated component and aggregated by component to generate a view that may show the cost of each component to the user. In particular, the routine 400 as well as other routines disclosed herein may be utilized in connection with about 60,000 classes and/or pattern (e.g., a package, class or method name) having about 30 characters to about 50 characters. However, these figures are not an upper bound.

Turning now to the routine 400, a profiling event may be received from a profiler agent 30 in block 405. In block 410, the profiling event received in the block 405 may be processed, and the package, class or method name is extracted. Specifically, the fully qualified method name is then used to access the component mapping tree in the block 415 to identify the associated component, however, the fully qualified method name need not only be the only name fed to the data structure. For example, in some embodiments, the class name may be utilized, however. The component that each package, class or method is associated with may be referenced in the terminating node of each package, class or method entry in the component mapping tree, even though only the fully qualified method name may be fed to the data structure. The component mapping tree may be accessed by traversing subsequent nodes in the tree corresponding to subsequent characters in the name of the package, class or method until the terminating node is reached. In particular, the nodes may be traversed until a terminator flag is encountered, which signals a terminating node. The component object associated with the terminating node may also be returned in the block 415.

Specifically, the component mapping tree may be traversed using a modified recursive depth first search algorithm. Those of ordinary skill in the art may appreciate that via this algorithm, the worst case number of operations that may be needed to achieve a match for a given class or method name may be equal to the number of characters in the class or method name. For example, if the package, class or method name has 13 characters, it may take approximately 13 operations to find the associated component. Indeed, the combination of the component mapping tree and the search algorithm may facilitate the mapping profiling costs to the associated components in real time (e.g., allow the cost of a profiling event to be mapped from a class or method to a component in real time).

As such, turning to block 420, a decision may be made in block 420 to determine whether the returned component object is null. If the component object is null ("yes" branch of the block 420), the cost of the profiling event is added to the current component in block 425. If the component object is not null ("no" branch of the block 420), the current component is set to the returned component object in the block 430, and the cost of the profiling event may be added to the current component in the block 425. In addition to the cost, method level information, class level information, and/or other information may be added as well.

After the block 425, a decision may be made in the block 435 to determine whether profiling has completed. If profiling has completed ("yes" branch of the block 435) because all of the profiling events have been processed, the routine 400 may conclude in block 440. Otherwise, if profiling has not completed ("no" branch of the block 435), control may pass to the block 405 to process the next profiling event.

Additionally, those of ordinary skill in the art will appreciate that drill down may be possible, as well as checks may be possible. For example, after profiling and associating the statistics with components has completed, the most expensive component may be determined. Furthermore, drill down on that most expensive component may be available to see which packages, classes, and/or methods are associated with that component. For example, the drill down may be performed to determine what percentage of the component's total cost each class, and each method is responsible. This data may be stored in the tree along with component, for example, in the terminating node. Furthermore, checks may be performed to ensure that that when all the costs of the classes are added together, they equal the costs of the component and that when all the costs of the methods are added together, they equal the cost of the component. Likewise, checks may be performed to ensure that that when all the costs of the classes are added together, they equal the costs of all of the components and that when all the costs of the methods are added together, they equal the costs of all of the components.

Figure 7:
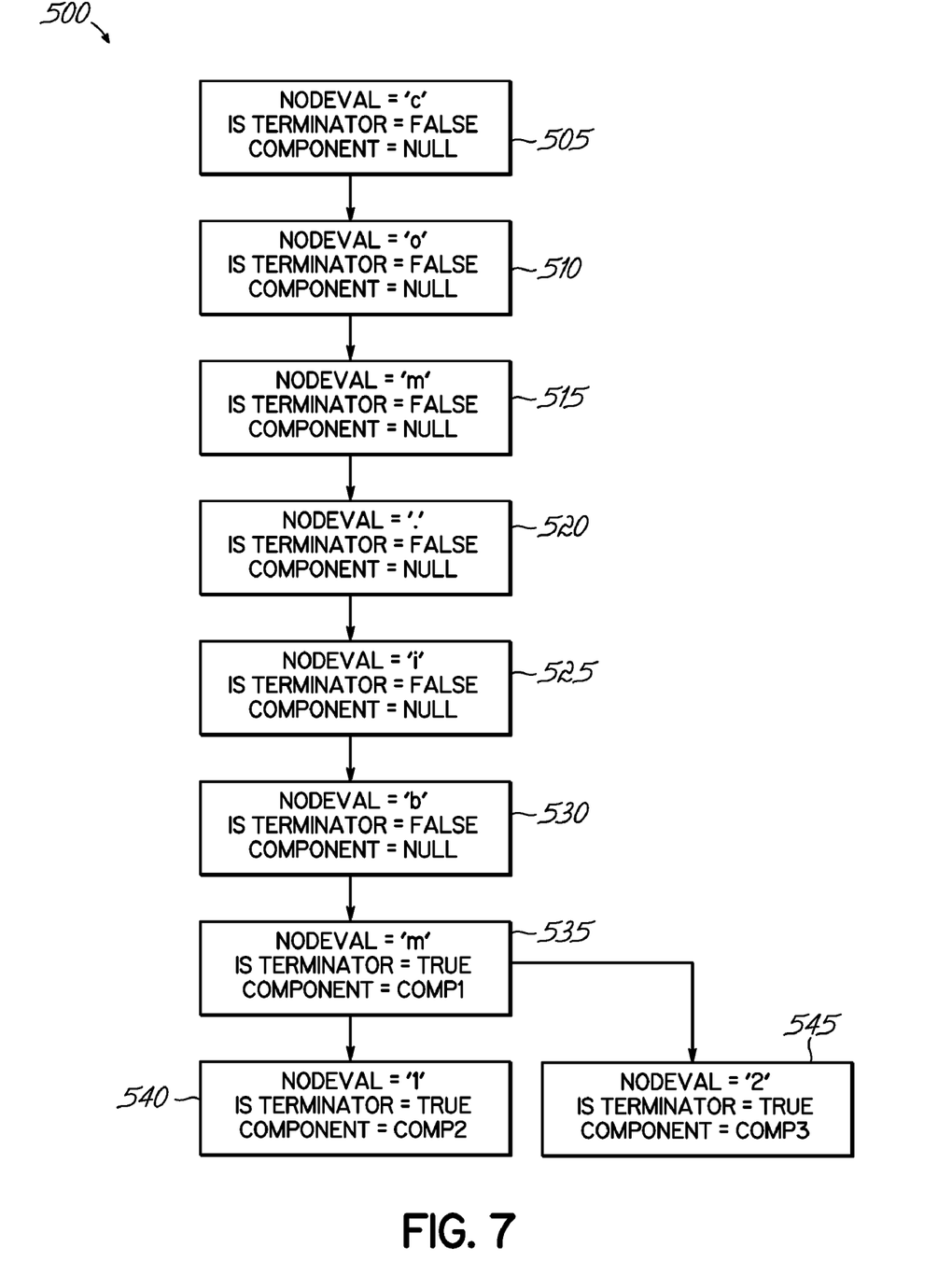
FIG. 7 is an illustration of an exemplary component mapping tree.

Turning to FIG. 7, this figure illustrates an exemplary component mapping tree 500, and how the tree may be structured. The example assumes that the component mapping tree 500 contains three classes: com.ibm; com.ibm1; and com.ibm2. The class com.ibm is mapped to component COMP1. The class com.ibm1 is mapped to component COMP2. The class com.ibm2 is mapped to component COMP3.

Starting with node 505, this node is the root node of the component mapping tree 500. Node 505 includes the character 'c'. Node 505 also includes a terminator flag set to false, indicating that node 505 is not a terminating node of the name of any package, class or method. The component associated with node 505 is null because node 505 is not a terminating node.

The next node in the component mapping tree 505 is node 510, which is a child node of the node 505. The node 510 includes the character 'o' and a false terminator flag, indicating that the node 510 is not a terminating node of the name of any package, class or method. The component associated with the node 510 is null because the node 510 is not a terminating node.

Next, node 515 is a child node of the node 510. The node 515 includes the character 'm' and a false terminator flag, indicating that the node 515 is not a terminating node of the name of any package, class or method. The component associated with the node 515 is null because node 515 is not a terminating node.

Next, node 520 is a child node of the node 515 and includes the character '.'. The node 520 also includes a false terminator flag, indicating that the node 520 is not a terminating node of the name of any package, class or method. The component associated with the node 520 is null because the node 520 is not a terminating node. Likewise, node 525 is a child node of the node 520, includes the character 'i', includes a false terminator flag, and the component associated with the node 525 is null because the node 525 is not a terminating node. Node 530 is a child node of the node 525, includes the character 'b', includes a false terminator flag, and the component associated with the node 530 is null because the node 530 is not a terminating node.

Next, node 535 is a child node of node 530 and includes the character 'm'. However, this node includes a true terminator flag, indicating that the node 535 is the terminating node of a class (i.e., the com.ibm class). The component associated with the node 535 is COMP1, and because the node 535 is the terminating node of the com.ibm class, COMP1 is the component associated with the com.ibm class. Thus, by traversing the tree 500, the component COMP1 that is associated with the com.ibm class may be determined. Furthermore, the aggregated costs associated with COMP1 may be determined to improve performance.

As the other two classes, com.ibm1 and com.ibm2, have in common many of the same characters in their names as the com.ibm class, these two classes are also mapped in the tree 500. As such, node 540 is a child node of node 535 and includes the character '1'. The node 540 also includes a true terminator flag, indicating that the node 540 is the terminating node of the com.ibm1 class. The component associated with the node 540 is COMP2 because the node 540 is the terminating node of the com.ibm1 class, which is mapped to COMP2. Furthermore, node 545 is also a child node of node 535 and includes the character '2'. The node 545 also includes a true terminator flag, indicating that the node 545 is the terminating node of the com.ibm2 class. The component associated with the node 545 is COMP3 because the node 545 is the terminating node of the com.ibm2 class, which is mapped to COMP3. Thus, by traversing the tree 500, the components COMP2 and COMP3 that are associated with the com.ibm1 and com.ibm2 classes, respectively, may be determined. Furthermore, the aggregated costs associated with the components COMP2 and COMP3 may be determined to improve performance.

Those of ordinary skill in the art will appreciate that profilers incorporating the principles of the present invention may offer advantages over conventional profilers. A profiler incorporating the principles of the invention may be highly scalable, and able to handle component mappings containing about 60,000 classes. A profiler incorporating the principles of the invention may be fast because the worst case number of operations for retrieving a component mapped to a package, class or method may be the number of characters in the name of the package, class or method such as the number of characters in the fully qualified name of the method. For example, a 600 MB profile may be processed in about one minute. Indeed, the upper limit of the number of operations to traverse the tree to find an associated component may still be the length of the name of the package, class or method such as the length of the fully qualified method name, regardless of the number of classes in the component mapping tree. Also, the tree may be memory efficient in that the tree representation of the mapping space eliminates redundant data, especially when pruning is performed. For example, the principles of the present invention may be able to process a 600 MB profile against a 60,000+ class component mapping in just 128 MB of memory.

Furthermore, it is also worth noting that via the terminator flags, the component associated with a package, class or method name may still be mapped even if the name is completely encapsulated by another package, class or method name. Specifically, no new nodes may need to be created and a terminator flag with a value of true may be provided for the node that represents the last character of the name that is completely encapsulated. As such, the tree may be searched for the longest possible match of the name to identify the component, without any additional operations.

For example, if com/ibm/test is to be added to the component mapping tree, no new nodes are created, but the node that represents the final 't' may have a terminator flag set to true. As a result, this modification allows the search algorithm to return the "longest possible match" without any additional operations. Assuming class com/ibm/test is associated with component A, the "longest possible match" of the component mapping tree with an input of com/ibm/test may retrieve the component result as component A because the method com/ibm/test.runTransaction( ) is mapped to component A in the component mapping tree. Similarly, assuming com/ibm/testclass2 is associated to component B, the "longest possible match" of this input may retrieve the component result as component B because the method com/ibm/testclass2.runTest( ) is mapped to component B in the component mapping tree. In particular, any method in a class may be considered to have the same component as the class. Alternatively, the shortest possible match may also be performed, to identify a component quickly, but those of ordinary skill in the art will appreciate that this may not be as accurate as using the longest possible match, which may identify the most specific match.

Thus, those of ordinary skill in the art may appreciate that due to the "longest possible match" approach, the component data may be mapped without needing all of the additional method information in the data structure. However, if the data structure is not a component mapping tree but backed with a different data structure such as a hash table, for example, every method for every class may need to have an entry in the hash table, which may result in a massive hash table and waste of memory. Furthermore, the hash table may require more rigid component mapping data such that a user may have to define the component mapping data in terms of fully qualified method names. Alternatively, the hash table may require more rigid component mapping data such that a user may have to define the component mapping data in terms of fully qualified class names. Moreover, in the case of deep package hierarchies, package based component definitions may require multiple look-up operations in hash table and a rules to resolve the results of the multiple lookups, which may impact performance. A hashtable implementation may also be limited to classes alone or methods alone (see FIG. 8). Alternatively, each profiling event may need to be further processed to extract the "class name" before looking it up in the hash table. Therefore, while the data structure may be a hash table, the tree-based implementation may utilize less memory, may have class level and method level entries co-exist, and may be more efficient and flexible than a hash table based implementation.

Additionally, in cases where a component mapping tree is extensive but not necessarily all inclusive, the pruning operation may allow mapping of some classes that would not have been previously mappable with the fully specific component mapping data. For example, some administration classes (e.g., SIP administration classes) may be correctly attributed to the container component as a result of pruning the component mapping tree, even though they did not appear in the full component mapping data. Thus, pruning may allow more partial classes or methods to be mapped and/or searched because pruning make the tree less specific.

Furthermore, a profiler consistent with the principles of the present invention may allow the smaller performance contributions of the numerous classes and methods to be attributed to their respective components such that a more meaningful performance analysis of an application (e.g., large software application or computer program) may be performed. For example, the individual memory footprints of each class or method may be aggregated into the memory footprints of their respective components, and a more meaningful analysis of the extent that each component is contributing to the overall memory footprint may be performed.

Indeed, conventional profilers provide data that may be to granular for use, which makes it difficult to track what is occurring and which components that are responsible. However, via the principles of the present invention, the components contributing the most to the cost of a large application may be identified. Furthermore, under each component, a list of the classes that belong to that component and their contributions may also be provided, and under each class, each method and its contribution may be provided, and under each method, other methods (e.g., J2EE API methods) that are called by the component classes and their contributions may be provided.

Moreover, as indicated hereinabove, users may have the ability to define their component mapping data as packages alone, classes alone, methods alone, or any combination of all three. In particular, the mapping of methods alone, classes alone, packages, alone, methods and classes, etc. is associated with how the user sets up his or her component mapping, with the profiler generally operating by executing a method and feeding the fully qualified method name and statistic to the data structure. Nonetheless, those of ordinary skill in the art may appreciate that this flexibility in defining the component mapping data may be made possible because the component mapping tree does not require an exact match and can get the longest or shortest match. As such, the principles of the present invention allow for seamlessly mixing of all three of these modes, better performance, and better resource utilization. Indeed, a single component mapping tree may be constructed from the above mapping and operate seamlessly. All that is seen, for example, is a component and one or more patterns associated with it.

While all of the present invention has been illustrated by a description of various embodiments and while these embodiments have been described in considerable detail, the applicant does not intend to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A computer-implemented method of collecting profile information for a component of a software program including at least one component, and the at least one component including multiple methods, the computer-implemented method comprising:

generating a data structure that maps a plurality of methods to a plurality of components, wherein each method in the plurality of methods includes a name, and wherein the data structure maps the plurality of methods to the plurality of components using at least a portion of the names of the plurality of methods;

in response to execution of a first method of the plurality of methods by a profiler during profiling of the software program:

determining a statistic associated with the execution of the first method;

accessing the data structure using the name of the first method to determine a respective component from among the plurality of components that is associated with the first method; and associating the determined statistic with the respective component;

determining for at least a second method among the plurality of methods the component that the second method maps to based upon the generated data structure, including determining that the second method maps to the respective component; and determining an aggregate cost associated with the respective component based on statistics associated with the first and second methods.

2. The computer-implemented method of claim 1, wherein mapping of the first method to the component is based upon only the first method, wherein the data structure maps a least a third method of the plurality of methods to a second respective component of the software program, wherein the third method includes a name, and wherein the data structure maps the third method to the second respective component using at least a portion of the name of the third method, the computer-implemented method further comprising:

in response to execution of the third method by the profiler during profiling of the software program:

determining a second statistic associated with the execution of the third method;

accessing the data structure using the name of the third method to determine the second component associated with the third method; and associating the second statistic with the second component.

3. The computer-implemented method of claim 1, wherein generating the data structure further comprises mapping the class associated with the first method, and wherein the data structure maps the first method and the class associated with the first method to the component using the portion of the name of the first method and using at least a portion of a name of the class.

4. The computer-implemented method of claim 1, wherein the data structure is a decision tree, the decision tree comprising a plurality of nodes.

5. The computer-implemented method of claim 4, wherein each character of the portion of the name of the first method is associated with a node in the plurality of nodes.

6. The computer-implemented method of claim 5, wherein a first node in the plurality of nodes includes a first character of the portion of the name of the first method, subsequent nodes in the plurality of nodes include subsequent characters of the portion of the name of the first method, and a terminating node in the plurality of nodes includes a last character of the portion of the name of the first method, and wherein each node associated with a character from the portion of the name of the first method other than the first character is related as a child node to a parent node associated with an immediately preceding character from the portion of the name of the first method.

7. The computer-implemented method of claim 5, further comprising associating a terminator flag with a node in the plurality of nodes, wherein the terminator flag is indicative of termination of the portion of the name of the first method.

8. The computer-implemented method of claim 4, further comprising pruning at least a portion of the decision tree to remove extraneous information from the decision tree, wherein the extraneous information includes redundant information.

9. The computer-implemented method of claim 4, wherein the component mapped to the first method is associated with a node in the plurality of nodes.

10. The computer-implemented method of claim 9, wherein the component mapped to the first method is associated with a terminating node in the plurality of nodes.

11. The computer-implemented method of claim 1, wherein mapping of the first method to the component is based upon input including the mapping of the first method to the component.

12. The computer-implemented method of claim 1, wherein accessing the data structure involves a modified recursive depth first search algorithm.

13. The computer-implemented method of claim 1, wherein the generated data structure comprises a decision tree, and wherein determining for at least the second method the component that the second method maps to further comprises pruning the decision tree.

14. A method of collecting profile information for a respective component of a software program including at least one component, and the at least one component including multiple methods, the computer-implemented method comprising:

generating a data structure that maps at least one pattern to the component, wherein the pattern includes at least one name, wherein the pattern is associated with a first method, and wherein the data structure maps the pattern to the respective component using at least a portion of the name of the pattern, wherein the data structure further maps a plurality of methods to a plurality of components, wherein each method in the plurality of methods includes a name, and wherein the data structure maps the plurality of methods to the plurality of components using at least a portion of the names of the plurality of methods;

in response to execution of the first method by a profiler during profiling of the software program:

determining a statistic associated with the execution of the first method;

accessing the data structure using a name of the first method to determine the respective component associated with the first method; and associating the determined statistic with the respective component;

determining for at least a second method among the plurality of methods the component that the second method maps to based upon the generated data structure, including determining that the second method maps to the respective component; and determining an aggregate cost associated with the respective component based on statistics associated with the first and second methods.

15. The computer-implemented method of claim 14, wherein the data structure is a decision tree, the decision tree comprising a plurality of nodes.

16. The computer-implemented method of claim 15, wherein the pattern is representative of a class and includes a name of the class, and wherein each character of the portion of the name of the class is associated with a node in the plurality of nodes.

17. The computer-implemented method of claim 15, wherein the pattern is representative of a package and includes a name of the package, and wherein each character of the portion of the name of the package is associated with a node in the plurality of nodes.

18. The computer-implemented method of claim 15, wherein the pattern is representative of the first method and includes a name of the first method, and wherein each character of the portion of the name of the first method is associated with a node in the plurality of nodes.

19. An apparatus, comprising:
at least one memory;
at least one processor; and
program code configured to be executed by the processor to collect profile information for at least one component of a software program, wherein the at least one component includes multiple methods, the program code configured to generate a data structure that maps a plurality of methods to a plurality of components, wherein each method in the plurality of methods includes a name, and wherein the data structure maps the plurality of methods to the plurality of components using at least a portion of the names of the plurality of methods; wherein the program code is further configured to in response to execution of a first method of the plurality of methods by a profiler during profiling of the software program, determine a statistic associated with the execution of the first method, access the data structure using the name of the first method to determine a respective component from among the plurality of components that is associated with the first method, and associate the determined statistic with the respective component, and wherein the program code is further configured to determine for at least a second method that the second method maps to the respective component, and determine an aggregate cost associated with the respective component based on statistics associated with the first and second methods.

20. The apparatus of claim 19, wherein the data structure maps the first method and the class associated with the first method to the component using the portion of the name of the first method and using at least a portion of the name of the class.

21. The apparatus of claim 19, wherein the data structure is a decision tree, the decision tree comprising a plurality of nodes.

22. The apparatus of claim 21, wherein each character of the portion of the name of the first method is associated with a node in the plurality of nodes and wherein the component mapped to the first method is associated with a node in the plurality of nodes.

23. An apparatus, comprising:
at least one memory;
at least one processor; and
program code configured to be executed by the processor to collect profile information for a component of a software program including at least one component, and the at least one component including multiple methods, the program code configured to generate a data structure that maps at least one pattern to the component, wherein the pattern includes at least one name, wherein the pattern is associated with a first method, and wherein the data structure maps the pattern to the component using at least a portion of the name of the pattern, wherein the data structure further maps a plurality of methods to a plurality of components, wherein each method in the plurality of methods includes a name, and wherein the data structure maps the plurality of methods to the plurality of components using at least a portion of the names of the plurality of methods; wherein the program code is further configured to, in response to execution of the first method by a profiler during profiling of the software program: determine a statistic associated with the execution of the first method; access the data structure using a name of the first method to determine the respective component associated with the first method; and associate the determined statistic with the respective component; and wherein the program code is further configured to determine for at least a second method that the second method maps to the respective component, and determine an aggregate cost associated with the respective component based on statistics associated with the first and second methods.

* * * * *